United States Patent [19]

McElroy

[11] Patent Number: 4,795,683
[45] Date of Patent: Jan. 3, 1989

[54] HIGH POWER DENSITY EVAPORATIVELY COOLED ION EXCHANGE MEMBRANE FUEL CELL

[75] Inventor: James F. McElroy, Suffield, Conn.

[73] Assignee: United Technologies Corporation, Hartford, Conn.

[21] Appl. No.: 76,970

[22] Filed: Jul. 23, 1987

[51] Int. Cl.$^4$ ............................................. H01M 8/04
[52] U.S. Cl. ........................................ 429/13; 429/26
[58] Field of Search ..................... 429/26, 33, 13, 42, 429/23, 24

[56] References Cited

U.S. PATENT DOCUMENTS

| | | | |
|---|---|---|---|
| 3,172,784 | 3/1965 | Blackmer | 429/13 |
| 3,528,858 | 9/1970 | Hodgdon et al. | 429/33 |
| 3,709,736 | 1/1973 | Adlhart et al. | 429/24 |
| 3,761,316 | 9/1973 | Stedman | 429/26 |
| 4,530,886 | 7/1985 | Sederquist | 429/26 |
| 4,596,748 | 6/1986 | Katz et al. | 429/26 |

OTHER PUBLICATIONS

Schutz, A Preliminary Investigation of Radiation Catalysis in Fuel Cells, Virginia Polytechnic Institute, Aug. 1979, Blacksburg, Va.

Primary Examiner—Donald L. Walton

[57] ABSTRACT

A method of evaporatively cooling an ion exchange membrane electrolyte fuel cell is disclosed. Liquid water mist 3 is introduced into the anode 6. A desiccant material 8 directs the liquid water mist 3 to the ion exchange membrane 12. Evaporation of a portion of both the product water and the supplied liquid water cools the cell and eliminates the need for a separate cooling chamber, resulting in a cell with high packing density, high current density capability and a large power to weight ratio.

8 Claims, 1 Drawing Sheet

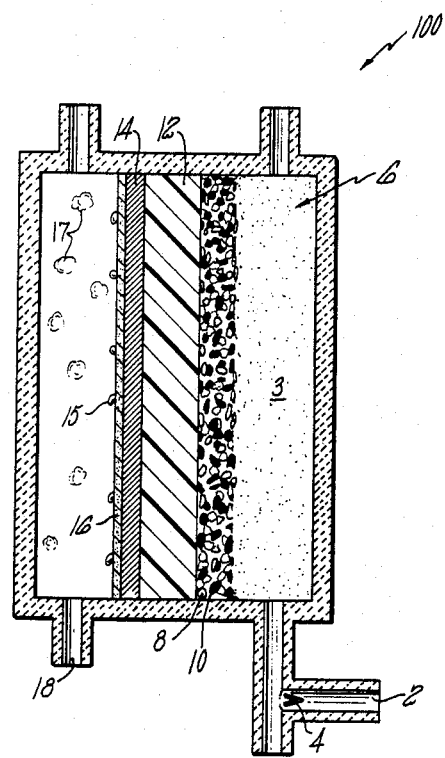

HIGH POWER DENSITY EVAPORATIVELY COOLED ION EXCHANGE MEMBRANE FUEL CELL

DESCRIPTION

1. Technical Field

This invention relates to electrochemical fuel cells, particularly ion exchange membrane fuel cells, and more particularly, to a method of cooling such fuel cells.

2. Background Art

Fuel cells within which oxygen and hydrogen gas are used to produce electrical current are well known in the art. Typically, an ion exchange membrane fuel cell stack is comprised of a plurality of individual fuel cells, each fuel cell including an anode, a cathode and an ion exchange membrane. The ion exchange membrane must be kept wet and there is always water present in a healthy ion exchange membrane.

Generally, electricity is generated in an ion exchange membrane fuel cell by a known mechanism. A fuel such as hydrogen gas is injected into the anode. The anode typically comprises platinum bound with fluorocarbon or a substrate on which is placed a catalyst, typically platinum. The amount of catalyst can vary and efforts have been made to reduce the amount of catalyst needed by adding a filler or ion exchange membrane material into the anode thereby having more of the generally expensive catalyst located near ion exchange membrane material and attempting thereby to maintain fuel cell efficiency while reducing the cost. In any event, in a typical cell, the catalyst located on the surface of the ion exchange membrane within the anode ionizes the fuel to form ions and free electrons. The free electrons pass via a suitable means to one terminal of the fuel cell with the other terminal being connected to the cathode electrode from which free electrons are supplied to reduce an oxidant, for example, oxygen aas. The ions pass through the ion exchange membrane to the cathode located on the opposite surface of the ion exchange membrane. The ions are solvated so with each ion several water molecules are also transported. Such water transport is referred to as electroosmosis or protonic pumping. The ions upon reaching the cathode electrode react with the oxidant which has been supplied to the cathode to form a liquid, typically water, on the surface of the cathode. This liquid can cause a problem of masking the oxidant's ability to contact the cathode catalyst thereby reducing the efficiency of the cell operation. This condition is referred to as flooding. To prevent such flooding, wet proofing is typically used in relationship with the cathode.

Unfortunately, not only electricity and product water are generated during this process but also heat. The heat is produced primarily at the cathode when the hydrogen ions and the oxygen combine. Some of this heat (about one third or less) can be removed by evaporation of this product water, but the remaining heat must be removed by other means.

The waste heat generated must be removed to allow a continuously operational fuel cell. For this reason, a traditional ion exchange membrane fuel cell has an added third compartment for cooling. The cooling chamber is typically a passage through which a coolant flows to effect heat transfer from the rest of the cell to the coolant. However, when the cooling chamber is added, the fuel cell displays a significantly lower packing density capability. This packing density is important for applications requiring low weight and low volume.

Accordingly, there remains a continuing need in the art for a fuel cell which exhibits high packing density without overheating.

DISCLOSURE OF THE INVENTION

A method of evaporatively cooling a fuel cell is disclosed wherein the cell exhibits high packing density by eliminating the need for a separate cooling chamber. The method provides for supplying a controlled amount of liquid water as a mist to the anode. To help control the amount of liquid water introduced into the anode, hydrogen fuel may optionally be recirculated. A desiccant material in the anode discourages local area flooding and transports the liquid water mist through the anode to the ion exchange membrane. Evaporation of a portion of the water formed in the cathode, both the supplied liquid water and the product water, cools the fuel cell without the need for a separate cooling chamber.

The fuel cell comprising aspirator means, an anode with a desiccant material throughout the anode to transport water mist, an ion exchange membrane, a cathode and wet proofing means wherein the fuel cell is cooled by evaporation of water from the cathode is also disclosed.

Other features and advantages of the present invention will become apparent in light of the following description thereof.

BRIEF DESCRIPTION OF THE DRAWING

The drawing is a diagrammatic representation of an evaporatively cooled fuel cell.

BEST MODE FOR CARRYING OUT THE INVENTION

One embodiment of the fuel cell of the present invention 100 is shown in the drawing (not to scale). The ion exchange membrane 12, the cathode 14 and the electrically conductive wet proofing 16 are conventional. In the pictured embodiment, liquid water is introduced through the water inlet 2 and then formed into a fine liquid water mist 3 by aspirator means 4. The liquid water mist 3 is introduced onto the anode 6 and directed to the ion exchange membrane 12 by the desiccant 8 (in powdered form) which has been applied to the catalyst 10. All of the water in the cathode 14, including the liquid water mist 3 which has been transported through the ion exchange membrane 12 and the product water formed at the cathode 14, is available to be evaporated and is shown in the drawing as excess liquid water 15 and evaporated water 17. Electrically conductive wet proofing 16 discourages water buildup on the cathode electrode surface. Both excess liquid water 15 and evaporated water 17 may be removed from the fuel cell 100 by the blowing air or oxygen gas reactant entering through inlet 18.

Liquid water may be supplied by any conventional methods or techniques. The water must be supplied in the liquid phase rather than the vapor phase because without a phase change no heat will be lost from the system and the evaporation of the water will not cool the cell. The amount of liquid water introduced is critical to the invention because the cell will protonically pump up to only about seven times the number of water molecules per hydrogen atom (i.e., 2H+protons).

Therefore, the amount of water introduced into the system must be controlled to effect cooling of the fuel cell and yet prevent flooding of the anode.

The amount of liquid water can be controlled in a variety of ways. For example, a simple valve could be used or the aspirator means could control the amount of liquid water introduced as well as aspirating the water. Additionally, a modest recirculation of the fuel is possible. This recirculation will help control the introduction rate by improved distribution of the mist over the entire anode surface area.

The amount of liquid water which is required to be introduced into the anode to effect the cell cooling depends upon the efficiency at which the cell is running. By the efficiency it is meant the ratio of the electrical power produced to the higher heating value of the hydrogen fuel. The lower the efficiency of the fuel cell, the more waste heat generated, and therefore, the greater the amount of liquid water which must be introduced in order to cool the fuel cell. For example, running a cell at about 50% efficiency requires the introduction of an amount of liquid water equal to about two and a half times the amount of product water formed, whereas, running the cell at 30% efficiency requires introducing almost four times the amount of product water formed. Typically, the amount of water introduced into the anode will be greater than two times, but less than seven times the product water production rate.

The aspirator can be any means which will form small droplets of water from supplied liquid water. The mist may be introduced into the anode directly or it may be introduced into the anode indirectly by first injecting the mist into the fuel stream. Preferably, the aspirator means will also function to control the critical amount of liquid water entering the anode, although other means for controlling the amount of liquid water could be used instead of the aspirator. The liquid water is introduced into the anode in mist form rather than in a stream to give better distribution of the water in the anode, thereby helping to prevent local area flooding. Additionally, the mist is beneficial because the ion exchange membrane water gradient can be essentially eliminated. The water gradient is due to the electroosmosis with a slower back migration rate of the water molecules in the ion exchange membrane, leaving the anode side of the ion exchange membrane drier than the cathode side of the ion exchange membrane. Because a drier ion exchange membrane has more internal resistance, eliminating the water gradient will lead to increased current density capability and further increases in power density. The Sonotek Corporation produces an ultrasonic nozzle which appears to be useful as an aspirator in this invention. The nozzle creates a very fine mist. In the practice of this invention, the finer the mist the better to discourage water flooding.

The desiccant material can be any material which will transport the liquid water mist from the surface of the anode to the ion exchange membrane and help prevent local area flooding. The desiccant material is preferably made of a material similar to the material of which an ion exchange membrane is made. For example, a material produced by E.I. Dupont DeNemours Company and marketed under the trademark Nafion ® would function well as a desiccant. The desiccant material can be applied either in liquid or powdered form. It is preferred that the desiccant used should not contaminate the membrane or there will be decreases in cell performance.

The amount of desiccant should be selected so as to maximize liquid water transport while minimizing interference with electron transport. Typically, the amount of desiccant material used is about 5 percent to about 50 percent of the catalyst.

The desiccant material can be applied to the anode in any way that allows transport of the liquid water mist to the ion exchange membrane surface. Preferably, a thin film coating of the desiccant (liquified membrane) is brushed onto the catalyst and platinum cells in the anode compartment. Other methods for placement of desiccant into the anode are as powders mixed with the catalysts or as a liquid by a spray technique.

The desiccant is important for two reasons: it transports the water from the anode to the ion exchange membrane and it helps prevent local area flooding. The desiccant is hydrophilic and will absorb the liquid water mist. This water will quickly travel along the path of the desiccant and be deposited on the ion exchange membrane surface. This provides an additional benefit of keeping the ion exchange membrane wet and increasing current density capability. The liquid water mist is carried through the ion exchange membrane by electroosmosis, reappears in the cathode and then passes through the wet proofing and at least a portion is evaporated.

The second important reason for the desiccant is to help prevent local area flooding. Flooding of the anode as a whole, is prevented by controlling the amount of water introduced into the anode. However, even with controlling the total amount of water introduced into the anode certain local areas would probably be flooded because of inconsistent distribution of the liquid water within the anode. This distribution is helped by both aspirating the liquid water into a mist and then having the desiccant material immediately absorbing and transporting the liquid water mist, thereby discouraging local area flooding.

The ion exchange membrane is a conventional electrolyte. Nafion TM ion exchange membrane supplied by the E.I. DuPont DeNemours Company can be used in the invention as well as other membranes such as those made by Dow Chemical Corporation. It is not necessary that the ion exchange membrane be made of the same material as that of the desiccant, however, the ion exchange membrane should be the sole electrolyte. Using other electrolytes such as a liquid acid electrolyte in this invention is not desirable because the acid concentration would be difficult to maintain because of the added water. Also, with liquid acid electrolyte maintenance of an evaporation rate which is similar to the sum of the product water rate and the introduction rate of water would be necessary. The present invention overcomes these problems using an ion exchange membrane electrolyte; therefore, only the introduction rate of the supplied liquid water must be controlled.

The cathode electrode of the fuel cell can be entirely conventional for these ion exchange fuel cells. Typically, these cathodes include a catalyst dispursed on a substrate. A most common cathode is formed of a platinum catalyst and a fluorocarbon substrate. Conventional wet proofing is also desirable to allow the oxygen access to the cathode without having to permeate water that has built up on the cathode surface.

The cell could be used anywhere that a large, very efficient power to weight ratio is required or desired. For example, it could be used in such devices as spacecraft, submarines or ground vehicles. Evaporation is the most effective way of heat removal. The main advantage in using this type of fuel cell, is that it removes heat effectively. Because of the evaporative cooling of the fuel cell, the number of chambers in the fuel cell is reduced from three chambers to two chambers. The elimination of the cooling chamber creates a fuel cell which can be packed more efficiently. The high packing density results in a stack which produces a great amount of power for its size.

It should be understood that the invention is not limited to any particular embodiment shown and described herein, but that various changes and modifications may be made without departing from the spirit and scope of this novel concept as defined by the following claims.

I claim:

1. A fuel cell comprising an anode containing a catalyst, an ion exchange membrane electrolyte, a cathode and wet proofing means wherein the improvement comprises:
   (a) aspirator means to form a liquid water mist from supplied liquid water;
   (b) means for controlling the amount of liquid water supplied to the anode; and
   (c) a desiccant material within the anode to transport the liquid water mist to the ion exchange membrane and to prevent local area flooding; wherein fuel cell cooling is effectuated by the evaporation of sufficient liquid water from the cathode through the wet proofing means so as to eliminate the need for a separate cooling compartment.

2. A fuel cell as claimed in claim 1 in which the amount of desiccant material within the anode is about 5% to about 50% of the catalyst.

3. A fuel cell as claimed in claim 1 further comprising: means for recirculating hydrogen gas into the anode to help control the amount of liquid water supplied to the anode.

4. A method of cooling a fuel cell comprising an anode containing a catalyst, an ion exchange membrane electrolyte, a cathode, and wet proofing means wherein the improvement comprises:
   (a) forming a liquid water mist from supplied liquid water;
   (b) controlling the amount of liquid water mist introduced into the anode to prevent flooding of the anode;
   (c) adding a desiccant material to the anode to prevent local area flooding and to transport the liquid water mist through the anode to the ion exchange membrane; and
   (d) evaporating water formed in the cathode and passed through the wet proofing means so as to cool the fuel cell.

5. A method of cooling a fuel cell as claimed in claim 4 in which the amount of liquid water mist introduced into the anode is about two times the amount of product water formed to about seven times the amount of product water formed.

6. A method of cooling a fuel cell as claimed in claim 4 in which the amount of desiccant material added is about 5% to about 50% of the catalyst.

7. A method of cooling a fuel cell as claimed in claim 4 further comprising: recirculating hydrogen fuel into the anode to help control the amount of liquid water supplied to the anode.

8. A method of increasing current directly capabilities in a fuel cell having an anode, an ion exchange membrane electrolyte, a cathode and wetproofing means comprising:
   (a) supplying liquid water mist to the anode;
   (b) controlling the amount of liquid water mist to prevent flooding of the anode;
   (c) transporting the liquid water to the ion exchange membrane to essentially eliminate the ion exchange membrane water gradient thereby lessening internal resistance of the cell and increasing current density and power density capabilities.

* * * * *